Sept. 27, 1960 M. G. KROGER 2,954,426
AUTOMATIC SHIFT OF COLOR BALANCE
Filed Dec. 23, 1957
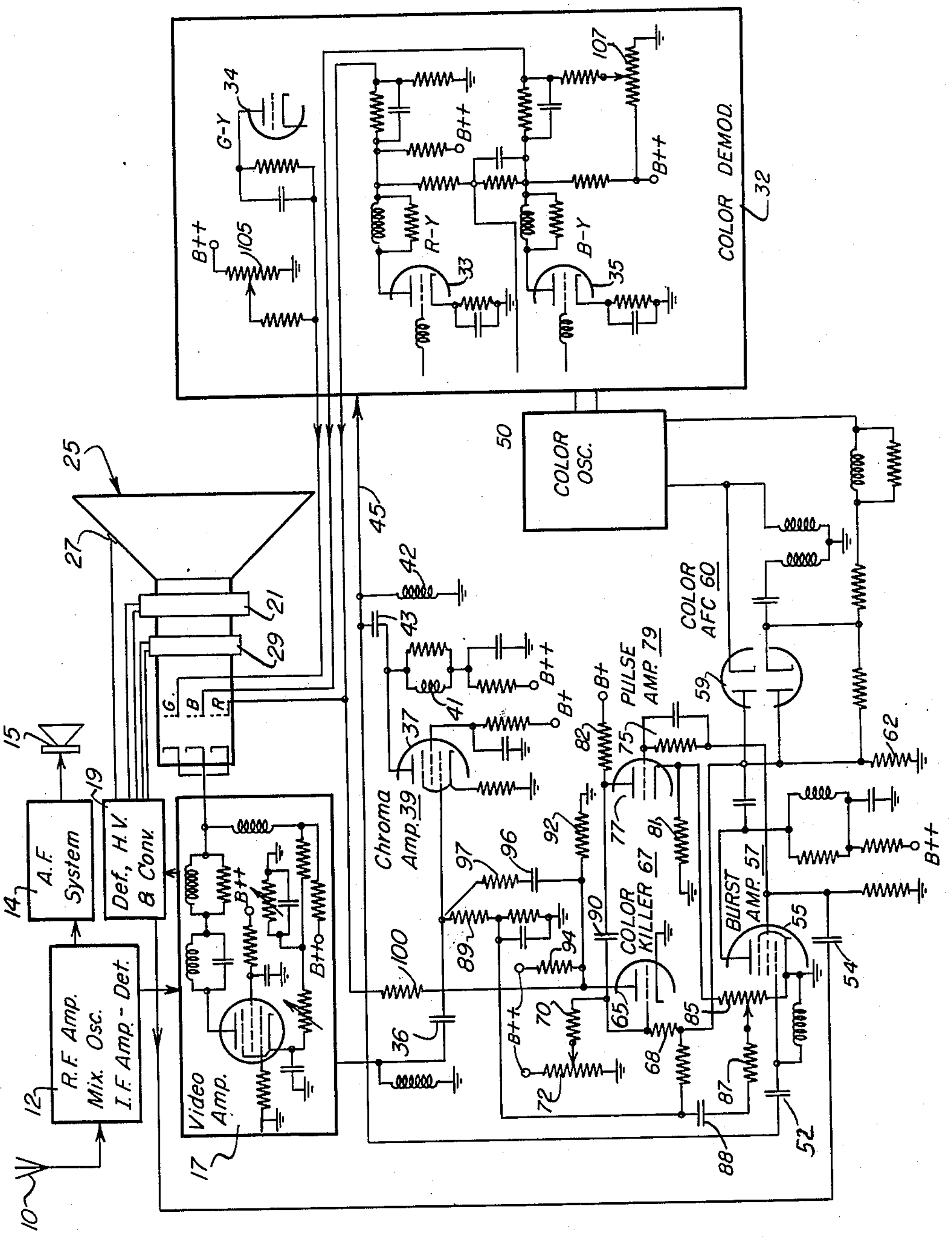
INVENTOR.
Marlin G. Kroger
BY Mueller & Aichele
Attys.

United States Patent Office 2,954,426

Patented Sept. 27, 1960

2,954,426

AUTOMATIC SHIFT OF COLOR BALANCE

Marlin G. Kroger, Elmhurst, Ill., assignor to Motorola, Inc., Chicago, Ill., a corporation of Illinois Filed Dec. 23, 1957, Ser. No. 704,539

2 Claims. (Cl. 178—5.4)

This invention relates to television receivers and more particularly to a receiver adapted to receive signals for reproduction of both color images and monochrome images.

In present day color television receivers it may be desirable to establish a slight red hue to the background white, or no signal raster, for a more correct reproduction of received color television signals. This results in a warmer tone for the flesh colors and aids in avoiding a blue or green tinting of yellows and reds. However, this same background setting which improves a color image, can result in an image of sepia tone when the receiver is used for reproduction of the standard monochrome, or black and white, signals. In many instances a monochrome image having a blue-black tone is desirable in order to enhance apparent contrast.

Accordingly, it is an object of this invention to improve the images reproduced by present day color television receivers when used for both color and monochrome reception.

Another object is to provide a color television receiver which automatically presents relatively warm toned color images with improved flash tone rendering on reception of color signals and which presents blue-black, or cold toned, black and white images on monochrome signal reception.

A further object is to provide a color television receiver in which the image background tinge is shifted between color and monochrome signal reception to provide more correct color reproduction and a more pleasing monochrome image.

A feature of the invention is the provision of a color television receiver having a cathode ray tube for producing separate red, green and blue color images to form a composite color picture, wherein the drive of the red image reproducer is increased during color signal reception for improving the overall image tone.

Another feature is the provision of an interconnection of the color killer stage and a tri-beam cathode ray tube in a color television receiver to increase the average beam current of the red image producing beam during color signal reception and for decreasing such beam current on monochrome signal reception so that the image is relatively warm in tone for color signal reception and relatively cold in tone for monochrome signal reception.

A further feature of the invention is the provision of a color television receiver as described in the preceding paragraph in which a resistor connected to the anode of the tube in the color killer stage couples a signal to the red beam control grid of the picture tube for image tone correction on both color and monochrome receiver operation.

Further objects, features and the attending advantages of the invention will be apparent upon consideration of the following description when taken in conjunction with the accompanying drawing in which the figure is a diagram, partly schematic, showing a color television receiver utilizing the invention.

In a particular form of the invention a television image tone, or overall white background of a television picture is made relatively warm on color signal reception and relatively cold on monochrome signal reception by increasing the drive of the red image beam control for color reception and decreasing this drive for monochrome reception. A preferred circuit to accomplish this result includes the interconnection of the red beam control grid in a tri-beam cathode ray tube to the anode of the tube in the color killer stage in the receiver. With the color killer tube biased to be conductive during monochrome reception and nonconductive when a color burst signal is received, a positive potential is available during color signal reception to increase the red beam drive at such time. This potential is substantially reduced upon monochrome signal reception so that the relative drive of the blue and green beams is greater and the image tone at such time will not assume a red or sepia tinge.

In the circuit shown in the drawing antenna 10 is connected to the receiver circuit 12 which includes a radio frequency amplifier circuit, a mixer and oscillator circuit for heterodyning a received signal, and an intermediate frequency amplifier to further select and amplify a received television signal. The circuit 12 also includes a detector circuit which has a portion for supplying a sound carrier to the audio frequency system 14 which may include suitable audio IF amplifiers and a ratio detector and audio frequency amplifiers to drive speaker 15.

The detector circuit in receiver circuit 12 also applies a composite video signal to the video amplifier circuit 17. Horizontal and vertical deflection signals developed by circuit 19 are applied to the deflection yoke 21 supported on the neck of the tri-beam cathode ray tube 25. The deflection signals are under the control of synchronizing components of the composite video signals from video amplifier circuit 17. The circuit 19 includes a circuit for providing high voltage for the anode of the cathode ray tube applied to the anode connector 27 thereof. Circuit 19 may also have a suitable convergence control system to energize the convergence field producing apparatus 29 which is also mounted on the neck of the cathode ray tube. This beam convergence control system is utilized to ensure proper convergence of the three electron beams throughout the various scanned positions thereof, as is familiar to those in the art.

The video amplifier circuit 17 also provides a luminance signal to the cathodes of the tube 25 in order to control the gray level of various elements of the reproduced image. The color demodulator system 32 is connected to the red, green and blue beam control grids in the cathode ray tube so that separate images of these colors are produced on the screen to appear in registry as a composite color picture. The $R-Y$ amplifier 33, the $G-Y$ amplifier 34, and the B—Y amplifier 35 provide the respective color signals and the output networks of these tubes bias the grids of the cathode ray tube.

The video signal is further applied through the capacitor 36 to the control grid of the tube 37 in the chroma amplifier 39. The anode circuit of tube 37 is tuned by inductors 41 and 42 and capacitor 43 to develop that portion of the composite video signal modulated by color information and this is applied to the color demodulator system 32 by way of lead 45. Also available within the bandpass of the output circuit of the chroma amplifier 39 is the color burst signal having a frequency of 3.58 megacycles and transmitted on the "back porch" of the horizontal synchronization pulses. As is understood in the art, the burst signal is a carefully controlled signal used as a standard of comparison, or reference, for controlling the color oscillator system 50 which is connected to the color demodulator 32 to furnish a reference signal to this system for proper phase detection of the color information signal. The burst signal is applied through capacitor 52 to the control grid of tube 55 in the burst amplifier 57. Tube 55 is gated into conduction by pulses from the line deflection system in circuit 19 so that there is available at the anode of tube 55 the color burst signal at a frequency of 3.58 megacycles. The burst signal is applied to the anodes of double diode 59 in the color automatic frequency control circuit 60 which regulates the color reference signal produced by oscillator 50, as previously mentioned.

As the color burst signal is applied to diode 59, a negative voltage is developed across resistor 62 connected between the anodes of diode 59 and ground. This voltage is applied to the control grid of triode 65 in the color killer stage 67 through the grid input resistor 68. The cathode of tube 65 is connected to ground and the negative voltage applied to the control grid thereof is sufficient to render this tube non-conducting, and it should be noted that this condition prevails when the color burst signal is present at the automatic frequency control circuit 60. The control grid of tube 65 is also connected through resistor 70 to the arm of potentiometer 72 which is coupled between ground and B++. Adjustment of potentiometer 72 will vary the potential on the grid of triode 65 thereby providing a threshold adjustment of the level at which the color killer triode is cut off.

Pulses at the line frequency are also applied from the circuit 19 through capacitor 54 and the parallel RC circuit 75 to the control grid of the triode 77 in the pulse amplifier 79. The cathode of triode 77 is connected to ground through resistor 81 and the anode is connected to B+ through resistor 82. Accordingly, as the line pulses are applied to triode 77 a positive going pulse is applied across potentiometer 85. The arm of potentiometer 85 is connected through resistor 87 and capacitor 88 and resistor 89 to the control grid of tube 37 in the chroma amplifier 39. Adjustment of potentiometer 85 will accordingly permit regulation of a positive going pulse of the line frequency applied to tube 37 so that this tube may operate at maximum gain during the line pulse when the burst signal is being conducted thereby and amplification of the burst signal will be maximized as it is applied to the control grid of tube 55 in the burst amplifier 57. Also the amplitude of the positive pulse applied to the control grid of tube 37 will control the gain of this tube for the chroma components of the signal since an average negative bias will be developed which is proportional to the amplitude of the pulse impressed.

The anode of the pulse amplifier triode 77 is connected through blocking capacitor 90 to the control grid of the color killer triode 65. Therefore, when line deflection pulses key the triode 77, a large negative going pulse is applied to the control grid of tube 65. The anode of tube 65 is connected to the junction of resistors 92 and 94 which are series connected between ground and B++. This anode is also connected through capacitor 96 and resistor 97 to the control grid of tube 37. Accordingly, it may be seen that when the burst signal is no longer present at the output of the burst amplifier 57, the diode 59 will no longer develop the cutoff biasing voltage across resistor 62, and triode 65 will be conductive. This condition will, of course, prevail when the monochrome or black and white television signal is being received since such a signal includes no color burst signal. At such time, with triode 65 conducting, the negative going pulses of line frequency applied to the control grid thereof will cause momentary cutoff of triode 65 thereby coupling large positive going pulses through capacitor 96 and resistor 97 to the grid of tube 37. Tube 37 may thus draw grid current to charge capacitor 35 so that tube 37 is self-biased to a non-conductive condition between line pulses. This condition serves the purpose of disabling the color portions of the television receiver when the monochrome television signals are being received.

Since the color killer triode 65 is non-conducting when a color television signal is being received, and conductive, between line pulses, when a black and white television signal is being received, the voltage at the anode thereof will be established at a higher positive level when a color television signal is received. Conversely, when a monochrome signal is received, and tube 65 is conductive, the voltage will be lowered considerably. To apply this anode potential of tube 65 as a control potential for the cathode ray tube 25, resistor 100 is connected between the anode of tube 65 and the control grid in tube 25 which regulates the beam producing the red image. When a color television signal is received, the red beam control grid is thus in the range of 1 or 2 volts above the potential thereof when a monochrome signal is being received. The relative biases of the "green" and "blue" grids may be established by adjustment of background controls 105, 107 at respective levels for producing a relatively blue-black tinge to the background for monochrome reception and then the image background, or white level, will automatically assume a slight red hue during color reception due to increased red beam drive to improve the rendering of flesh colors and avoid blue or green tinting of yellows and reds reproduced in the composite color picture. However, when a monochrome or black and white signal is received, the reddish hue is no longer produced and the image tone may assume the blue black tone since the relative drive of the blue and green beams has increased with respect to the drive of the red beam.

The invention provides therefore a simple and inexpensive method of improving the image tone in a television receiver adapted to reproduce color and monochrome images. The circuit as described automatically adapts the receiver to present an image of comparatively warm tone for color reception and of a colder tone for monochrome reception. The system thus corrects the background setting of the overall picture to produce a desirable image tone for both color and black and white television reception.

I claim:

1. A television receiver adapted to receive color television signals including a color control burst signal and further to receive monochrome television signals, including in combination, a tri-beam cathode ray tube having first, second and third beam control electrode means and wherein the beam control electrode means are respectively associated with screen portions adapted to emit light of red, green and blue colors for forming individual images associated with such colors to produce a color picture in response to color television signals and a monochrome picture in response to monochrome television signals, a receiver circuit means for operating said cathode ray tube, said receiver circuit means including direct current circuit means for biasing each of said beam control electrode means to a first bias condition with respective levels of beam conduction caused by said first, second and third electrode means for production of a picture having a relatively cold background tone during monochrome signal reception, color television signal demodulating means with a color killer stage for disabling said demodulating means in the absence of said burst signal, said color killer stage having electron valve means adapted to produce a direct current control potential on reception of the color control burst signal, and circuit means for applying said direct current control potential to said first beam control electrode means with a polarity for increasing the drive thereof with respect to the drive of said second and third electrode means upon reception of color television signals thereby biasing said electrode means to a second bias condition for production of a picture having a relatively warm background tone during color signal reception.

2. A television receiver adapted to receive color television signals including a color control burst signal and further to receive monochrome television signals, including in combination, a tri-beam cathode ray tube having first, second and third electron beams producing means having respective control grids associated therewith and wherein the electron beam producing means are respectively associated with screen portions adapted to emit light of red, green and blue colors for forming individual images associated with such colors to produce a color picture in response to color television signals and a monochrome picture in response to monochrome television signals, receiver circuit means for operating said cathode ray tube, said receiver circuit means including direct current circuit means for biasing each of said control grids to a first bias condition with respective levels of beam conduction caused by said first, second and third beam producing means for production of a picture having a relatively blue background tone during monochrome signal reception, color television signal demodulating means with a color killer stage for disabling said demodulating means in the absence of said burst signal, said color killer stage having electron valve means with an output electrode at which appears a direct current control potential increasing in a positive direction on reception of the color control burst signal, and a resistor coupled between said output electrode and said first control grid for applying said direct current control potential to said first control grid and increasing the drive of first electron beam producing means with respect to the drive of said second and third electron beam producing means upon reception of color television signals thereby biasing said electron beam producing means to a second bias condition for production of a picture having a relatively red background tone during color signal reception.

References Cited in the file of this patent

UNITED STATES PATENTS

| | | |
|---|---|---|
| 2,744,155 | Kihn | May 1, 1956 |
| 2,839,599 | Epstein | June 17, 1958 |